US012726290B2

(12) United States Patent
Bilra et al.

(10) Patent No.: US 12,726,290 B2
(45) Date of Patent: Sep. 1, 2026

(54) METHOD FOR TIME DISTRIBUTION IN A COMMUNICATION NETWORK OF A VEHICLE, AND COMMUNICATION NETWORK

(71) Applicant: Bayerische Motoren Werke Aktiengesellschaft, Munich (DE)

(72) Inventors: Manjeet Singh Bilra, Hoerlkofen (DE); Mohamed-Saad Abdelhameed, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 238 days.

(21) Appl. No.: 18/832,146

(22) PCT Filed: Dec. 13, 2022

(86) PCT No.: PCT/EP2022/085517
§ 371 (c)(1),
(2) Date: Jul. 23, 2024

(87) PCT Pub. No.: WO2023/147922
PCT Pub. Date: Aug. 10, 2023

(65) Prior Publication Data

US 2025/0141577 A1 May 1, 2025

(30) Foreign Application Priority Data

Feb. 2, 2022 (EP) .................................... 22154659

(51) Int. Cl.
*H04J 3/06* (2006.01)
*H04J 3/14* (2006.01)
*H04L 9/40* (2022.01)

(52) U.S. Cl.
CPC .......... *H04J 3/0673* (2013.01); *H04J 3/0667* (2013.01); *H04J 3/14* (2013.01); *H04L 63/123* (2013.01)

(58) Field of Classification Search
None
See application file for complete search history.

(56) References Cited

U.S. PATENT DOCUMENTS

2016/0318522 A1* 11/2016 Tanaka .............. H04L 12/40091
2017/0135175 A1* 5/2017 Sugimoto ............ H05B 47/198
(Continued)

FOREIGN PATENT DOCUMENTS

EP 2 506 470 A1 10/2012

OTHER PUBLICATIONS

International Search Report (PCT/ISA/210) issued in PCT Application No. PCT/EP2022/085517 dated Feb. 8, 2023 (4 pages).
(Continued)

*Primary Examiner* — Phirin Sam
(74) *Attorney, Agent, or Firm* — Crowell & Moring LLP

(57) ABSTRACT

Provided is a method for time distribution in a communication network of a vehicle. The method includes: sending, from a grandmaster to a first slave, a first time stamp taken from a grandmaster clock; generating, at the first slave, a first time tuple including the first time stamp and a second time stamp taken from a first slave clock at the time of receiving the first time stamp; sending, from the first slave to a second slave a third time stamp taken from the first slave clock, a fourth time stamp calculated based on the third time stamp and the first time tuple using a predefined calculation method, and the first time tuple; calculating, at the second slave, a fifth time stamp based on the third time stamp and the first time tuple; and comparing, at the second slave, the fifth time stamp to the fourth time stamp.

14 Claims, 2 Drawing Sheets

(56) References Cited

U.S. PATENT DOCUMENTS

2019/0173862 A1* 6/2019 Kim ........................ H04L 9/083
2019/0217870 A1* 7/2019 Nakano ............. B60W 50/0205
2019/0363815 A1 11/2019 Bogenberger et al.
2020/0295861 A1 9/2020 Zinner
2021/0224169 A1* 7/2021 Kang ................. G05B 19/0421

OTHER PUBLICATIONS

Written Opinion (PCT/ISA/237) issued in PCT Application No. PCT/EP2022/085517 dated Feb. 8, 2023 (6 pages).
Extended European Search Report issued in European Application No. 22154659.1 dated Aug. 2, 2022 (6 pages).
Diarra, A. et al., "Improved Clock Synchronization Start-Up Time for Ethernet AVB-Based In-Vehicle Networks", 20th Conference on Emerging Technologies and Factory Automation (ETFA) IEEE, Sep. 8, 2015, pp. 1-8, XP032797336 (8 pages).

* cited by examiner

METHOD FOR TIME DISTRIBUTION IN A COMMUNICATION NETWORK OF A VEHICLE, AND COMMUNICATION NETWORK

BACKGROUND AND SUMMARY

The present disclosure is directed to a method for time distribution in a communication network of a vehicle, a communication network configured to carry out the method, and a vehicle comprising the communication network.

In the development of automated vehicles, such as highly automated cars (i.e., SAE level 3 or higher), an accurate time synchronization throughout different bus systems has to be ensured. According to the AUTOSAR standard (see Overview of Functional Safety Measures in AUTOSAR, AUTOSAR CP Release 4.3.0) timing is an important property of embedded systems. Safe behavior requires that the systems actions and reactions are performed within the right time. The right time can be described in terms of a set of timing constraints that have to be satisfied. However, an AUTOSAR software component cannot ensure proper timing by itself. It depends on proper support by the AUTOSAR runtime environment and the basic software. During integration the timing constraints of the AUTOSAR software components need to be ensured.

In general, for an automated or autonomous vehicle, e.g., a car, there is a lot of data processing including perception from multiple sensors. The data processing may be done on one control unit (ECU), e.g., included in one of the sensors, thereby taking the data from the sensors as an input, fusing the data and processing the data before sending data, e.g., a control signal, to the vehicle. Especially for fusing the data, the data of the multiple sensors need to have the same, i.e., a synchronized, timestamp.

Difficulties in ensuring a required level in safety integrity during time synchronization may arise of somewhere in the synchronization chain a non-safe ECU is installed.

In the light of this prior art, the object of the present disclosure is to provide a device and/or a method being suitable for overcoming at least the above-mentioned difficulties of the prior art, respectively.

The object is solved by the features of the independent claim. The dependent claims have preferred further embodiments of the disclosure as their subject matter.

More specifically, the object is solved by a method for time distribution in a communication network of a vehicle. The method may be part of a time synchronization carried out to synchronize local times of multiple communication network instances to a common local time, i.e., the local time of a so-called (grand-) master.

The communication network comprises a grandmaster with a grandmaster clock, a first slave connected directly to the grandmaster and comprising a first slave clock, and a second slave connected indirectly via the first slave to the grandmaster and comprising a second slave clock.

The first, the second and/or the grandmaster may be or may be part of an electronic control unit (ECU) for the vehicle. The electronic control unit can be an intelligent processor-controlled unit that can communicate with other modules, optionally via a central gateway (CGW). The control unit can form part of the vehicle's onboard network via fieldbuses such as the CAN bus, LIN bus, MOST bus and/or FlexRay or via automotive Ethernet, optionally together with a telematics control unit. The electronic control unit may be configured to control functions relevant to a driving behavior of the vehicle, such as an engine control system, a power transmission, a braking system and/or a tire pressure control system. In addition, some or all driver assistance systems such as parking assistant, adaptive cruise control, lane departure warning, lane change assistant, traffic sign recognition, light signal recognition, approach assistant, night vision assistant, intersection assistant, and/or many others may be controlled by the control unit.

Here, a hierarchical master-slave architecture for clock distribution, analogously to the one specified in IEEE 1588 standards, is used. Those networks may use the Precision Time Protocol (PTP) for time synchronization. A simplified PTP system frequently consists of ordinary clocks connected to a single network, and no boundary clocks are used. A grandmaster is elected, and all other clocks synchronize directly to it. The architecture according to the present disclosure is more complex and comprises a first slave acting as a boundary clock. More specifically, under this architecture, the time distribution system, i.e., the communication network, comprises one or more communication media (network segments), and one or more clocks. An ordinary clock is a device with a single network connection and is either the source of (master or leader) or destination for (slave or follower) a synchronization reference. A boundary clock has multiple network connections and can accurately synchronize one network segment to another. A synchronization master is selected for each of the network segments in the system. The root timing reference is called the grandmaster. The grandmaster transmits synchronization information to the clocks residing on its network segment. The boundary clocks with a presence on that segment then relay accurate time to the other segments to which they are also connected. That is, according to the present disclosure, the first slave acts as the boundary clock and thus master for the second slave which is solely connected via the first slave to the grandmaster and thus may not directly receive clock/time information from the grandmaster.

A problem that may arise with such a configuration is that the boundary clock, i.e., the first slave, may not synchronize the dependent/second slave with sufficient safety integrity. More specifically, safety integrity may be defined using Automotive Safety Integrity Level (ASIL) which is a standardized risk classification scheme defined by ISO 26262-Functional Safety for Road Vehicles standard. This is an adaptation of the Safety Integrity Level (SIL) used in IEC 61508 for the automotive industry. This classification helps defining the safety requirements necessary to be in line with the ISO 26262 standard. The ASIL is established by performing a risk analysis of a potential hazard by looking at the Severity, Exposure and Controllability of the vehicle operating scenario. The safety goal for that hazard in turn carries the ASIL requirements. There are four ASILs identified by the standard: ASIL A, ASIL B, ASIL C, ASIL D. ASIL D dictates the highest integrity requirements on the device/method and ASIL A the lowest. Hazards that are identified as QM do not dictate any safety requirements. That is, the problem solved by the following method may be formulated with respect to only one aspect covered by the disclosure as providing a solution for time synchronization with ASIL integrity when the boundary clock is solely QM.

The method comprises sending, from the grandmaster to the first slave, a first time stamp taken from the grandmaster clock.

The first time stamp may be sent as synchronization/sync message of the PTP. More specifically, PTP may be used for time synchronization. PTP uses the following message types: Sync, Follow_Up, Delay_Req (i.e., delay request) and Delay_Resp (i.e., delay response). These messages are used by ordinary and boundary clocks and communicate time-related information used to synchronize clocks across the network.

The method comprises generating, at the first slave, a first time tuple based on the received first time stamp of the grandmaster clock and a second time stamp taken from the first slave clock at the time of receiving the first time stamp.

More specifically, the first time stamp, i.e., the Sync message, may be used optionally together with the information received in the Follow_Up message and the Delay_Resp message to calculate the grandmaster time at the first slave. This calculated grandmaster time may be put into the first time tuple together with the local time at the first slave at the time of calculating the grandmaster time, i.e., at the time of receiving the Delay_Resp message at the first slave.

The method comprises sending, from the first slave to the second slave, a third time stamp taken from the first slave clock, a fourth time stamp calculated based on the third time stamp and the first time tuple using a predefined calculation method, and the first time tuple.

The method may comprise calculating, at the second slave, a fifth time stamp based on the third time stamp and the first time tuple using the predefined calculation method, and comparing, at the second slave, the fifth time stamp to the fourth time stamp.

More specifically, the first slave may function as a master for the second slave with respect to time synchronization, wherein PTP may be used for the time synchronization. Similar to the first time stamp, the fourth time stamp, i.e., the Sync message, may be used optionally together with the information received in the Follow_Up message and the Delay_Resp message to calculate the grandmaster time at the second slave. Moreover, to ensure that the fourth time stamp was calculated correctly at the first slave device, the second slave device recalculated the fourth time stamp, i.e., calculated the fifth time stamp based on the third time stamp and first time tuple, and compares the fourth and the fifth time stamp to each other. In case the fourth time stamp was calculated correctly at the first slave, the fifth and the fourth time stamp are the same. By doing so, even if the first slave is only QM, but the grandmaster and the second slave are ASIL qualified, the second slave may be synchronized to the grandmaster with safety/ASIL integrity.

In the following, preferred implementation of the above described method are outlined in detail.

The method may comprise synchronizing, at the first slave, a local time of first slave to a local time of the grandmaster using the first time tuple.

That is, the first time tuple includes the grandmaster time at the time of synchronizing the first slave associated with the local time of the first slave at the time of synchronizing the first slave. Therefore, the first slave may use the first time tuple to calculate based on the current/actual counting value of its local clock (i.e., so-called local time stamp) the grandmaster time (so-called grandmaster time stamp) and may use this calculated time in any communication in the network and/or for labelling data received at, saved at and/or sent from the first slave.

The method may comprise sending the first time tuple from the first slave to the grandmaster, and validating, at the grandmaster, the synchronized local time of the first slave based on the received first time tuple.

The method may comprise synchronizing, at the second slave, a local time of the second slave to a local time of the grandmaster using the fourth time stamp of the first slave clock and/or the fifth time stamp.

More specifically, synchronizing, at the second slave, the local time of the second slave to the local time of the grandmaster may comprise generating, at the second slave, a second time tuple including the received fourth time stamp of the first slave clock and/or the fifth time stamp, and a sixth time stamp taken from the second slave clock at the time of receiving the fourth time stamp, and synchronizing the local time of the second slave to the local time of the first slave using a second time tuple.

That is, the grandmaster time calculated at the second slave as described above may be put into the second time tuple together with the local time at the second slave at the time of calculating the grandmaster time, i.e., at the time of receiving the Delay_Resp message from the first slave. That is, the second time tuple includes the grandmaster time at the time of synchronizing the second slave associated with the local time of the second slave at the time of synchronizing the second slave. Therefore, the second slave may use the second time tuple (similar to the first slave using the first time tuple) to calculate based on the current/actual counting value of its local clock (i.e., so-called local time stamp) the current/actual grandmaster time (so-called grandmaster time stamp) and may use this calculated time in any communication in the network and/or for labelling data received at, saved at and/or sent from the first slave.

The method may comprises sending the second time tuple from the second slave to the first slave, and validating, at the first slave, the synchronized local time of the second slave based on the received second time tuple.

Synchronizing, at the second slave, the local time of second slave to the local time of the grandmaster may only be done if a result of comparing, at the second slave, the fifth time stamp to the fourth time stamp is that the fifth time stamp and the fourth time stamp are the same. Otherwise, an error (flag) may be raised by the second slave.

The grandmaster clock, the first slave clock and/or the second slave clock may comprise or may be a monotonic clock. A monotonic clock is continuously increasing clock.

The above described method may be summarized with respect to one more concert implementation thereof and solely for exemplary purposes as follows.

The Background of the disclosure is to propose a method for time synchronization of a non-safe ECU to achieve higher level of safety integrity by cross verification of both sides of a time link in different ECUs.

The setup may comprise one grandmaster ECU which could be considered safe, i.e., with safety integrity. The second part of the effect chain may be an intermediate ECU which is considered as a non-safe ECU, i.e., without safety integrity. The third and optionally last part of the effect chain may be an ECU which is safe, i.e., with safety integrity. In the above setup, if the intermediate ECU does not have any safety integrity, this may result in corruption or manipulation of safety relevant time information. To overcome this problem the following method may be used.

The Grandmaster may send a Sync PTP message to the intermediate ECU. The intermediate ECU may create a time tuple based on its own local counter and the PTP (T)Sync. message received from the grandmaster. The Intermediate ECU may send the time tuple information and PTP timestamps as part of a validation message back to the grandmaster ECU.

In the next Step, the intermediate ECU may also create its own grandmaster timestamp (GTimestamp) based on its local timer and its timestamps and the time tuple created based on the received grandmaster time.

In addition to that, the intermediate ECU may send the GTimestamp including the local timestamp and time tuple to the last ECU.

The last ECU with safety integrity may receive the (T)Sync PTP message from the intermediate ECU. It may also receive the Gtimestamp, time tuple and local timestamp from the intermediate ECU.

The last ECU may provide all the time information to a 'Tsync Verifier' (time synchronization verifier) which may do a plausibility check whether the received Gtimestamp from the intermediate ECU is within a given tolerance based on timestamps including the received local clock timestamp and the received time tuple information.

If it is verified that the Gtimestamp does not have any jump, the Tsync verifier may send a valid message to time tuple generator in last ECU optionally with a constant delay after the plausibility check.

The last ECU creates a time tuple based on GTimestamp and the local timer of the last ECU when the time tuple generator receives this validity message.

This time tuple could be further used by any application software as a safe time and in sync with grandmaster time with safety integrity.

Furthermore, a communication network of a vehicle is provided, the network comprising a grandmaster with a grandmaster clock, a first slave connected directly to the grandmaster and comprising a first slave clock, and a second slave connected indirectly via the first slave to the grandmaster and comprising a second slave clock. The network is configured to carry out the above-described method.

More specifically, the grandmaster may be configured to send a first time stamp taken from the grandmaster clock to the first slave.

The first slave may be configured to generate a first time tuple including the received first time stamp of the grandmaster clock and a second time stamp taken from the first slave clock at the time of receiving the first time stamp.

The first slave may be configured to send a third time stamp taken from the first slave clock, a fourth time stamp calculated based on the third time stamp and the first time tuple using a predefined calculation method, and the first time tuple to the second slave.

The second slave may be configured to calculate a fifth time stamp based on the third time stamp and the first time tuple using the predefined calculation method, and to compare the fifth time stamp to the fourth time stamp.

The first slave may be configured to synchronize its local time to a local time of the grandmaster using the first time tuple.

The first slave may be configured to send the first time tuple from the first slave to the grandmaster. The grandmaster may be configured to validate the synchronized local time of the first slave based on the received first time tuple.

The second slave may be configured to synchronize its local time to a local time of the grandmaster using the fourth and/or the fifth time stamp.

Therefore, the second slave may be configured to generate a second time tuple including the received fourth time stamp of the first slave clock and/or the fifth time stamp, and a sixth time stamp taken from the second slave clock at the time of receiving the fourth time stamp. The second slave may be configured to synchronize the local time of the second slave to the local time of the first slave using the second time tuple.

The second slave may be configured to send the second time tuple from the second slave to the first slave. The first slave may be configured to validate the synchronized local time of the second slave based on the received second time tuple.

The second slave may be configured to synchronize the local time of second slave to the local time of the grandmaster only if a result of comparing, at the second slave, the fifth time stamp to the fourth time stamp is that the fifth time stamp and the fourth time stamp are the same.

The grandmaster clock, the first slave clock and/or the second slave clock may comprise a monotonic clock.

Moreover, the description given above with respect to the method and the communication network applies mutatis mutandis to the vehicle and vice versa.

Furthermore, a vehicle is provided wherein the vehicle comprises the above-described communication network.

The vehicle may be an automobile, e.g., a car. The vehicle may be automated. The automated vehicle can be designed to take over lateral and/or longitudinal guidance at least partially and/or temporarily during automated driving of the automated vehicle. The communication network may be used in the automated driving.

The automated driving may be such that the driving of the vehicle is (largely) autonomous. The vehicle may be a vehicle of autonomy level 1, i.e., have certain driver assistance systems that support the driver in vehicle operation, for example, adaptive cruise control (ACC).

The vehicle can be a vehicle of autonomy level 2, i.e., be partially automated in such a way that functions such as automatic parking, lane keeping or lateral guidance, general longitudinal guidance, acceleration and/or braking are performed by driver assistance systems.

The vehicle may be an autonomy level 3 vehicle, i.e., automated in such a conditional manner that the driver does not need to continuously monitor the system vehicle. The vehicle autonomously performs functions such as triggering the turn signal, changing lanes, and/or lane keeping. The driver can attend to other matters but is prompted by the system to take over control within a warning time if needed.

The vehicle may be an autonomy level 4 vehicle, i.e., so highly automated that the driving of the vehicle is permanently taken over by the system vehicle. If the driving tasks are no longer handled by the system, the driver may be requested to take over control.

The vehicle may be an autonomy level 5 vehicle, i.e., so fully automated that the driver is not required to complete the driving task. No human intervention is required other than setting the destination and starting the system. The vehicle can operate without a steering wheel or pedals.

Moreover, the description given above with respect to the method and the communication network applies mutatis mutandis to the vehicle and vice versa.

An embodiment is described with reference to FIGS. 1 and 2 below.

DETAILED DESCRIPTION OF THE DRAWINGS

Figure 1:
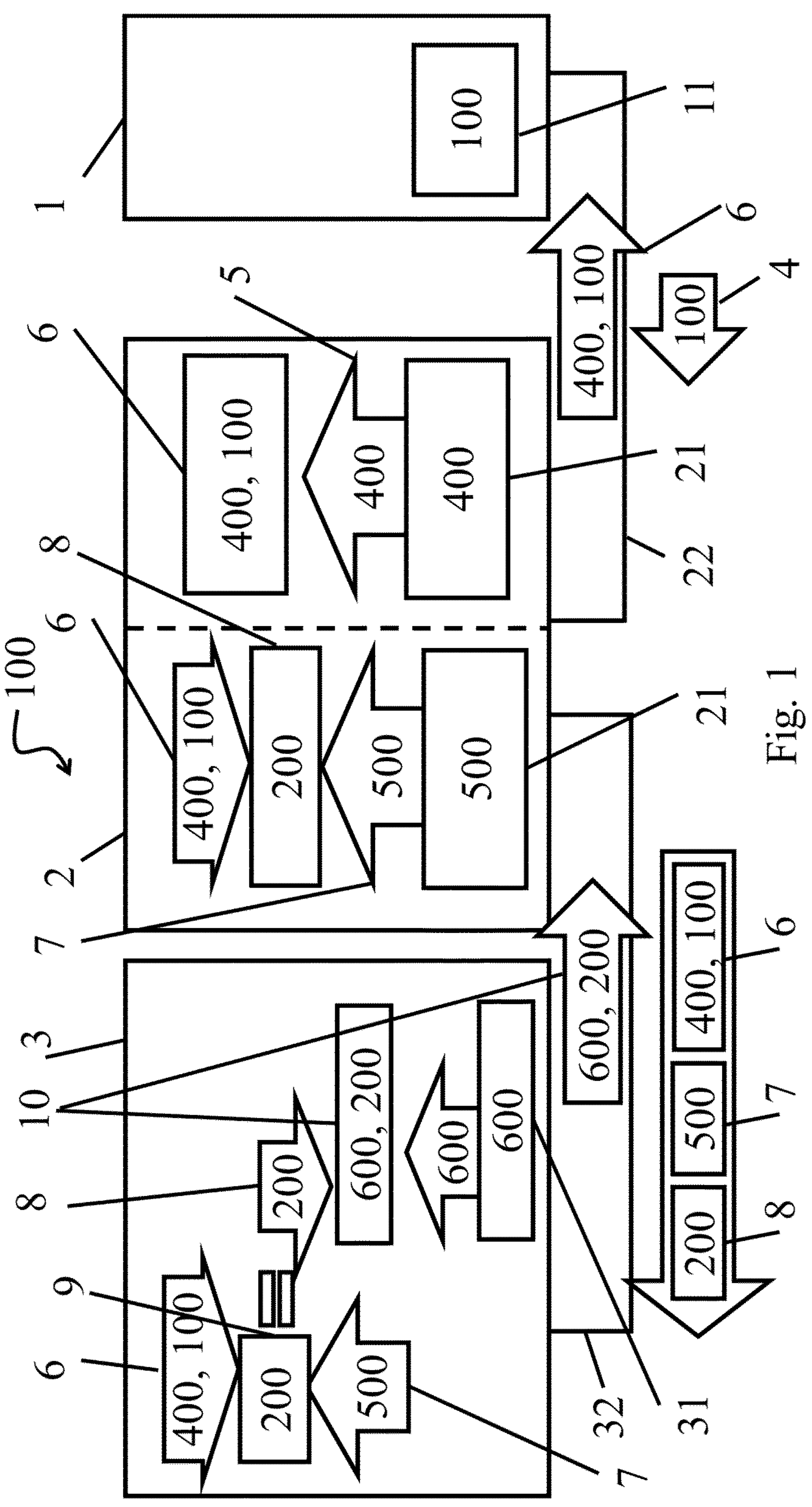
FIG. 1 shows schematically a communication network of a vehicle according to the disclosure.

In FIG. 1 a communication network 100 of a (not shown) vehicle is shown. The network 100 comprises a grandmaster (ECU) 1 with a grandmaster clock 11, a first slave (ECU) 2 connected via a first data line 22 directly to the grandmaster 1 and which comprises a first slave clock 21, and a second slave 3 connected via a second data line 32 directly to the first slave 2 and which comprises a second slave clock 31. Thus, the second slave 3 is solely indirectly connected via the first slave 2 to the grandmaster 1. The grandmaster clock 11, the first slave clock 21 and/or the second slave clock 31 are monotonic clocks, respectively. The grandmaster 1 and the second slave 3 are ASIL qualified, and the first slave 2 is QM.

Figure 2:
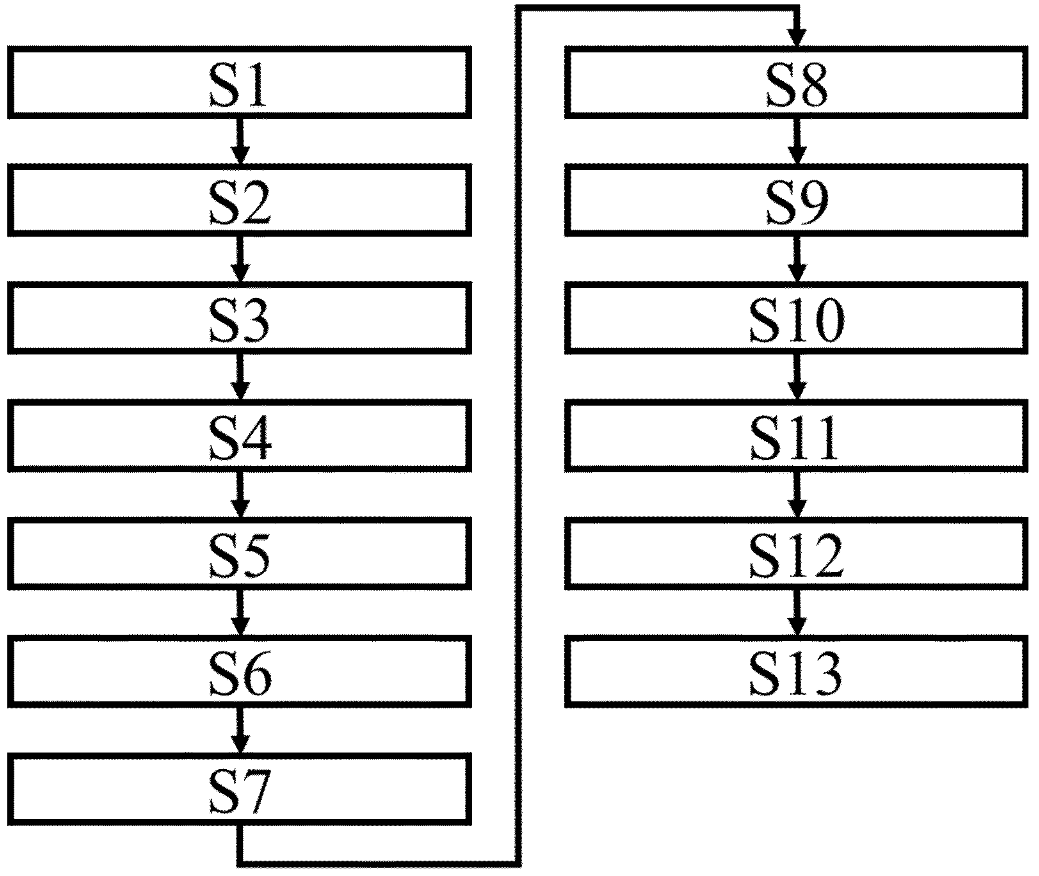
FIG. 2 shows a flowchart of a method for time distribution in the communication network FIG. 1 according to the disclosure.

The network 100 is configured to carry out a method for time distribution, wherein a flowchart of this method is shown in FIG. 2. As can be gathered from FIG. 2, the method comprises substantially thirteen steps S1-S13.

In a first step S1 of the method, the grandmaster 1 takes an actual from the grandmaster clock 11, here 100, and sends this value as a first time stamp 4 to the first slave 2 via the first data line 22.

In a second step S2 of the method, when receiving the first time stamp 4, the first slave 2 takes an actual value/a second time stamp 5 of its clock 21, here 400, and generates a first time tuple 6 including the received first time stamp 4 of the grandmaster clock 11 and the second time stamp 5 taken from the first slave clock 21 at the time of receiving the first time stamp 4.

In a third step S3 of the method, the first slave 2 synchronizes its local time to a local time of the grandmaster 1 using the first time tuple 6.

In a fourth step S4 of the method, the first slave 2 sends the first time tuple 6 and optionally the second time stamp 5 (not shown in FIG. 1) from the first slave 2 to the grandmaster 11.

In a fifth step S5 of the method, the grandmaster 11 validates the synchronized local time of the first slave 2 based on the received first time tuple 6 and optionally based on the received second time stamp 5. The validating may include comparing the first and/or the second time stamp 4, 5 with the received first time tuple 6.

After the fourth step S4 the time synchronization of the first slave 2 is done. These first four steps S1-S4 of the method are shown on the right side of the first slave 2 in FIG. 1. However, inter alia since the verification in the fifth step S5 takes some time, there is a delay between the fourth and a sixth step S6 of the method. Therefore, the following synchronization process starting with the sixth step S6 of the method start with an increased value of the first slave clock 21, here 500, and is shown on the left side of the first slave 2.

In the sixth step S6 of the method, the first slave 2 takes an actual value, here 500, of the first slave clock 21 and uses this value in form of a third time stamp 7 to calculate, in a seventh step S7 of the method, a fourth time stamp 8 calculated based on the third time stamp 7 and the first time tuple 6 using a predefined calculation method. Here, the fourth time stamp 8 is calculated by determining a difference between the second time stamp 5 and the third time stamp 7 (here: 500−400=100) and adding the difference to the first time stamp 4 (here: 100+100=200).

In an eighth step S8 of the method, the first slave 2 sends the first time tuple 6, the third time stamp 7 and the fourth time stamp 8 to the second slave 3 via the second data line 32.

In a ninth step S9 of the method, the second slave 3 calculates a fifth time stamp based on the received third time stamp 7 and the first time tuple 6 using the predefined calculation method that was used by the first slave 2 in the seventh step S7.

In a tenth step S10 of the method, the second slave 3 compares the calculated/determined fifth time stamp 9 to the received fourth time stamp 8. The second slave only carries out the following steps of the method, i.e., synchronizes the local time of second slave to the local time of the grandmaster, if a result of the comparison is that the fifth time stamp and the fourth time stamp are the same. Otherwise, the second slave 3 raises an error flag.

In an eleventh step S11, the second slave 3 synchronize its local time to the local time of the grandmaster 1 using the fourth and/or the fifth time stamp.

Therefore, the second slave generates a second time tuple 9 including the received fourth time stamp 8 and/or the fifth time stamp 9, and a sixth time stamp 10 taken from the second slave clock 31 at the time of receiving the fourth time stamp 8. The second slave 31 may be configured to synchronize the local time of the second slave 3 to the local time of the first slave 2 using the second time tuple 10.

In a twelfth step S12 of the method, the second slave 3 sends the second time tuple 10 optionally together with the received fourth and/or the fifth time stamp 8, 9 to the first slave 2.

In a thirteenth step S13 of the method, the first slave 2 validates the synchronized local time of the second slave 3 based on the received second time tuple 10 and optionally based on the received fourth and/or fifth time stamp 8, 9. The validating may include comparing the fifth and/or the fourth time stamp 8, 9 with the received second time tuple 10.

| Reference signs | |
|---|---|
| 1 | grandmaster |
| 11 | grandmaster clock |
| 2 | first slave |
| 21 | first slave clock |
| 22 | first data line |
| 3 | second slave |
| 31 | second slave clock |
| 32 | second data line |
| 4 | first time stamp |
| 5 | second time stamp |
| 6 | first time tuple |
| 7 | third time stamp |
| 8 | fourth time stamp |
| 9 | fifth time stamp |
| 10 | second time tuple |
| 100 | communication network |
| S1-S13 | steps of the method |

The invention claimed is:

1. A method for time distribution in a communication network of a vehicle, the communication network including:

a grandmaster with a grandmaster clock;

a first slave connected directly to the grandmaster and including a first slave clock; and a second slave connected indirectly via the first slave to the grandmaster and including a second slave clock;

the method comprising:

sending, from the grandmaster to the first slave, a first time stamp taken from the grandmaster clock;

generating, at the first slave, a first time tuple including the received first time stamp of the grandmaster clock and a second time stamp taken from the first slave clock at a time of receiving the first time stamp;

sending, from the first slave to the second slave:

a third time stamp taken from the first slave clock, a fourth time stamp calculated based on the third time stamp and the first time tuple using a predefined calculation method, and the first time tuple, calculating, at the second slave, a fifth time stamp based on the third time stamp and the first time tuple using the predefined calculation method, and comparing, at the second slave, the fifth time stamp to the fourth time stamp.

2. The method according to claim 1, further comprising: synchronizing, at the first slave, a local time of first slave to a local time of the grandmaster using the first time tuple.

3. The method according to claim 2, further comprising: sending the first time tuple from the first slave to the grandmaster; and validating, at the grandmaster, the synchronized local time of the first slave based on the received first time tuple.

4. The method according to claim 3, further comprising: synchronizing, at the second slave, a local time of the second slave to a local time of the grandmaster based on the fourth and/or the fifth time stamp.

5. The method according to claim 2, further comprising: synchronizing, at the second slave, a local time of the second slave to a local time of the grandmaster based on the fourth and/or the fifth time stamp.

6. The method according to claim 1, further comprising: synchronizing, at the second slave, a local time of the second slave to a local time of the grandmaster based on the fourth and/or the fifth time stamp.

7. The method according to claim 6, wherein synchronizing, at the second slave, the local time of the second slave to the local time of the grandmaster comprises:

generating, at the second slave, a second time tuple including the received fourth time stamp of the first slave clock and/or the fifth time stamp, and a sixth time stamp taken from the second slave clock at the time of receiving the fourth time stamp, and synchronizing the local time of the second slave to the local time of the first slave using the second time tuple.

8. The method according to claim 7, further comprising: sending the second time tuple from the second slave to the first slave; and validating, at the first slave, the synchronized local time of the second slave based on the received second time tuple.

9. The method according to claim 8, wherein synchronizing, at the second slave, the local time of second slave to the local time of the grandmaster is only done if a result of comparing, at the second slave, the fifth time stamp to the fourth time stamp is that the fifth time stamp and the fourth time stamp are the same.

10. The method according to claim 6, wherein synchronizing, at the second slave, the local time of second slave to the local time of the grandmaster is only done if a result of comparing, at the second slave, the fifth time stamp to the fourth time stamp is that the fifth time stamp and the fourth time stamp are the same.

11. The method according to claim 7, wherein synchronizing, at the second slave, the local time of second slave to the local time of the grandmaster is only done if a result of comparing, at the second slave, the fifth time stamp to the fourth time stamp is that the fifth time stamp and the fourth time stamp are the same.

12. The method according to claim 1, wherein the grandmaster clock, the first slave clock and/or the second slave clock comprises a monotonic clock.

13. A communication network of a vehicle, the communication network comprising:

a grandmaster with a grandmaster clock;

a first slave connected directly to the grandmaster and including a first slave clock; and a second slave connected indirectly via the first slave to the grandmaster and including a second slave clock;

wherein the communication network is configured to send, from the grandmaster to the first slave, a first time stamp taken from the grandmaster clock;

generate, at the first slave, a first time tuple including the received first time stamp of the grandmaster clock and a second time stamp taken from the first slave clock at the time of receiving the first time stamp;

send, from the first slave to the second slave:

a third time stamp taken from the first slave clock, a fourth time stamp calculated based on the third time stamp and the first time tuple using a predefined calculation method, and the first time tuple, calculate, at the second slave, a fifth time stamp based on the third time stamp and the first time tuple using the predefined calculation method, and compare, at the second slave, the fifth time stamp to the fourth time stamp.

14. A vehicle comprising the communication network according to claim 13.

* * * * *